Figure 1:
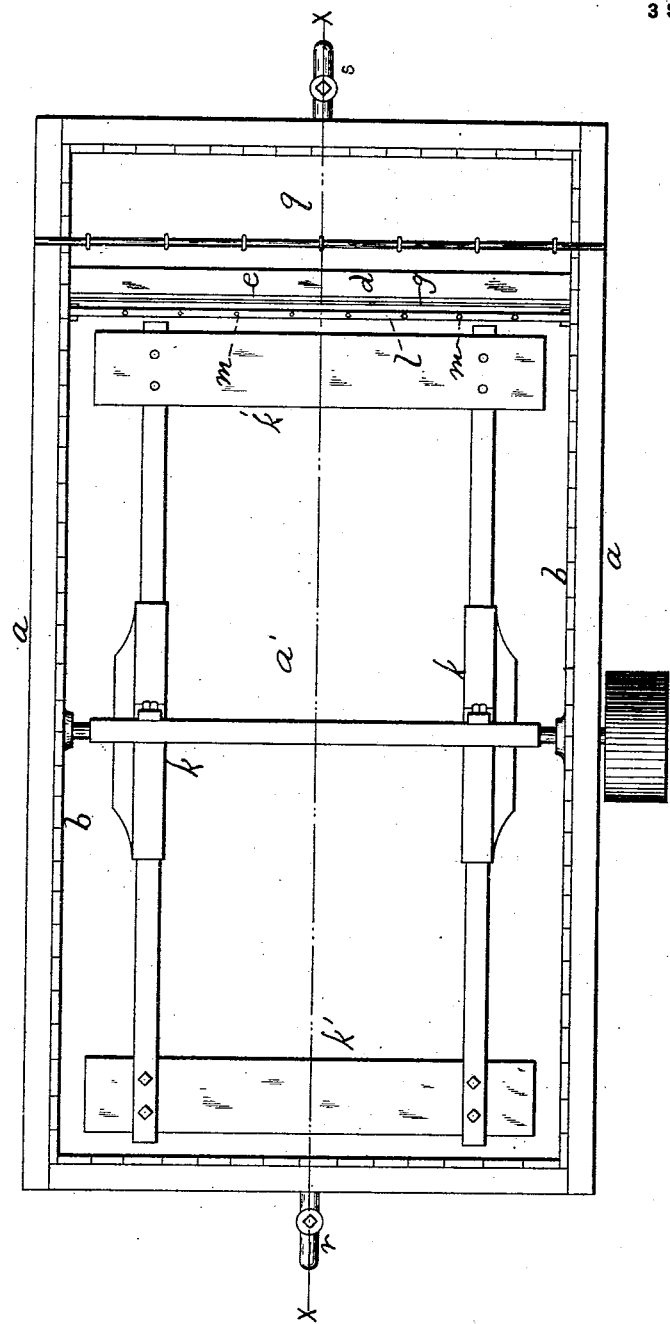

No. 684,182. Patented Oct. 8, 1901.
F. J. BRIGGS.
APPARATUS FOR BLEACHING ANIMAL OR VEGETABLE FIBER AND FABRIC MADE THEREFROM.
(Application filed Jan. 17, 1901.)
(No Model.) 3 Sheets—Sheet 1.

WITNESSES
INVENTOR

No. 684,182. Patented Oct. 8, 1901.
F. J. BRIGGS.
APPARATUS FOR BLEACHING ANIMAL OR VEGETABLE FIBER AND FABRIC MADE THEREFROM.
(Application filed Jan. 17, 1901.)
(No Model.) 3 Sheets—Sheet 2.

Witnesses
A. A. Bonney.
E. P. Small.

Inventor
Frank J. Briggs
By his Atty.
Henry W. Williams

THE NORRIS PETERS CO., PHOTO-LITHO., WASHINGTON, D. C.

No. 684,182. Patented Oct. 8, 1901.
F. J. BRIGGS.
APPARATUS FOR BLEACHING ANIMAL OR VEGETABLE FIBER AND FABRIC MADE THEREFROM.
(Application filed Jan. 17, 1901.)
(No Model.) 3 Sheets—Sheet 3.

WITNESSES — INVENTOR —

UNITED STATES PATENT OFFICE.

FRANK J. BRIGGS, OF EVERETT, MASSACHUSETTS, ASSIGNOR OF ONE-THIRD TO HENRY A. LOCKE AND GEORGE F. TARBELL, OF CAMBRIDGE, MASSACHUSETTS.

APPARATUS FOR BLEACHING ANIMAL OR VEGETABLE FIBER AND FABRIC MADE THEREFROM.

SPECIFICATION forming part of Letters Patent No. 684,182, dated October 8, 1901.

Application filed January 17, 1901. Serial No. 43,562. (No model.)

*To all whom it may concern:*

Be it known that I, FRANK J. BRIGGS, a citizen of the United States, residing at Everett, in the county of Middlesex and State of Massachusetts, have invented new and useful Improvements in Apparatus for Bleaching Animal or Vegetable Fiber and Fabric Made Therefrom, of which the following is a specification.

This apparatus is particularly intended for use in the process of bleaching paper-pulp made of wood or animal hair or fabric made from animal or vegetable fiber, which is often bleached after it has been made into fabric.

The common methods now in use for bleaching animal or vegetable fiber are, as far as I am aware, confined to the employment of chlorid of lime, which is dissolved in water, thereby forming the bleaching liquor and the electrolysis of chlorid of sodium, whereby chlorin gas is formed at the positive and caustic soda at the negative pole. The machinery and mechanical appliances employed for the collection of the chlorin gas after electrolysis has taken place, as well as the tanks, cells, &c., which are used for forcing the chlorin gas into a prepared solution of lime and water, thereby forming a bleaching liquor, are very expensive and quite intricate. The pulp is run into a large tank and the bleaching liquor is mixed with it by an agitator, the length of time required depending on the strength of the liquor used.

In my invention or improvement I do away with the above-described process and use a diaphragm, and by the protection and disposal of platinum electrodes and the use of sulfurous acid, together with the direct application of electricity to a solution of chlorid of sodium and water into which the animal or vegetable fiber has been placed, I bleach direct, thereby rendering the above-described indirect process unnecessary.

The nature of my invention is illustrated in the accompanying drawings, in which—

Figure 2:
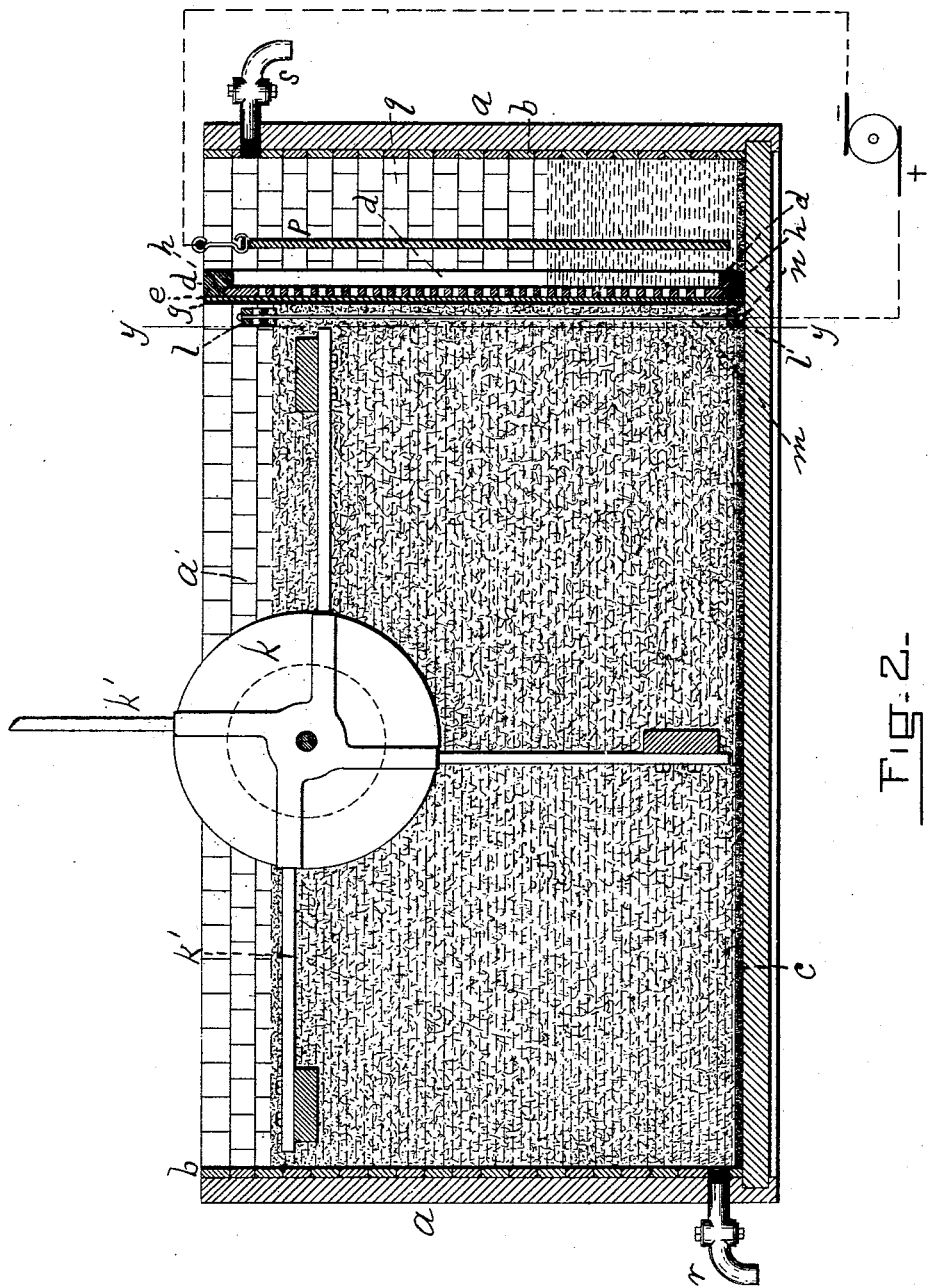
Figure 3:
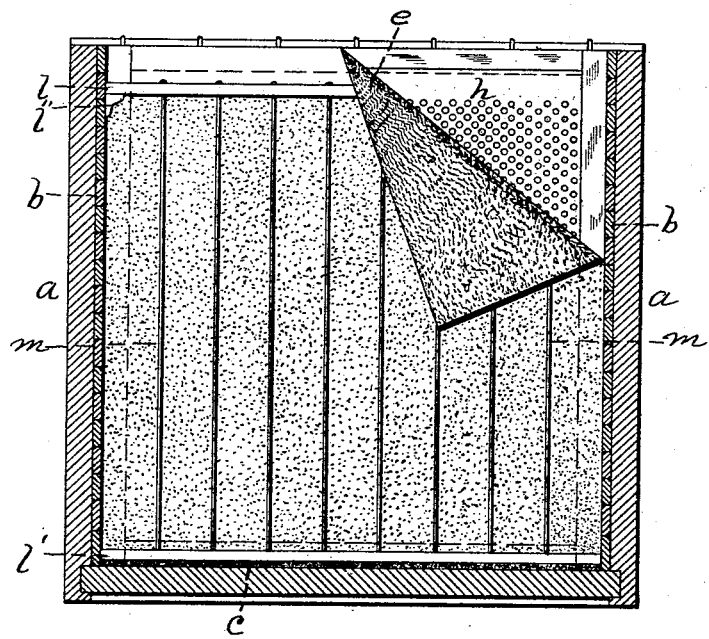
Figure 4:
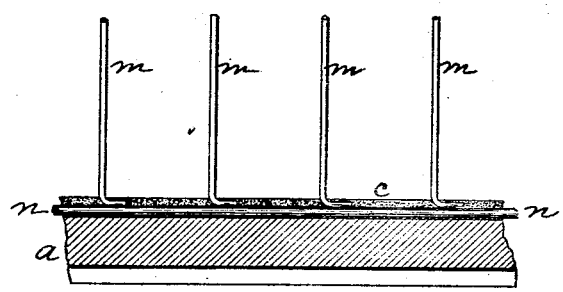

Figure 1 is a plan view of an apparatus embodying my invention. Fig. 2 is a longitudinal section taken on line X, Fig. 1. Fig. 3 is a cross-section taken on line Y, Fig. 2. Fig. 4 is an enlarged detail in vertical section.

Similar letters of reference indicate corresponding parts.

$a$ represents a suitable tank, the exact shape of which is not material. It is preferably lined with glazed bricks $b$, and its bottom is covered with a layer of cement $c$. A diaphragm is supported at one end of the tank— say about two feet from the end wall. This diaphragm comprises a wooden or iron frame $d$, fitting into the tank and having stretched upon it a piece of asbestos cloth $e$, having its side which is toward the body of the tank covered with cement $g$. On the other side of the cloth $e$ and within the frame $d$ is a plate of perforated iron $h$. The chamber $a'$, which the diaphragm faces, has mounted in it an agitator $k$, having suitable arms or beaters $k'$.

The positive electrode consists of the frame $l\, l'$, sustained and supported in front of the diaphragm by brackets $l''$ or other suitable means, said frame supporting platinum wires or rods $m$, Figs. 3 and 4, which connect the upper and lower bars of the frame. The platinum wires $m$ extend into the layer of cement $c$ and are connected at their lower ends by the copper wire $n$. The negative electrode may consist of any suitable conductor, such as the plate $p$, preferably of iron or copper, in the chamber $q$, containing caustic soda, (NaOH.)

The pulp is placed in the chamber $a'$ of the tank with a solution of chlorid of sodium and sulfurous acid and the agitator rotated in any desired manner.

By means of this apparatus I bleach direct. The residuum can be drawn off by means of the faucet $r$, and the overflow of the liquor in the chamber $q$ by means of the faucet $s$.

In case it should be deemed desirable or convenient to place the fiber or substance to be treated in a different or separate receptacle the solution above described is placed in the tank $a$ without the fiber, and the chlorin solution thus formed is conducted in any suitable manner to the tank containing the fiber or substance to be acted on.

I do not confine myself to the design of the tank nor to the material used in its construction or in the construction of the other parts, except so far as the material is necessary in order that such may or may not be rendered conductive. Moreover, the location of the diaphragm may be changed as far as is deemed practicable.

Having thus fully described my invention, what I claim, and desire to secure by Letters Patent, is—

In an apparatus of the character described, a tank; a diaphragm placed within said tank and comprising a frame, a covering of asbestos cloth stretched thereupon, a covering of cement upon the side of the cloth next to the pulp or anode chamber, and a perforate metallic plate supported by the frame on the side of the asbestos cloth opposite the cement; and electrodes, one of which is placed in said chamber and the other in the cathode-chamber of the tank, said electrodes being provided with suitable conductors, the electrodes with their conductors being insulated at their lower ends by being sunken in a floor-covering of non-conductive material, whereby the fiber within the bleaching solution is treated to the direct application of electricity, substantially as described.

In testimony whereof I have signed my name in the presence of two subscribing witnesses.

FRANK J. BRIGGS.

Witnesses:
HENRY W. WILLIAMS,
A. N. BONNEY.